United States Patent
Staudenmaier et al.

(10) Patent No.: US 10,147,463 B2
(45) Date of Patent: Dec. 4, 2018

(54) VIDEO PROCESSING UNIT AND METHOD OF BUFFERING A SOURCE VIDEO STREAM

(71) Applicants: Michael Andreas Staudenmaier, Munich (DE); Vincent Aubineau, Areches (FR); Ioseph E. Martinez-Pelayo, Austin, TX (US)

(72) Inventors: Michael Andreas Staudenmaier, Munich (DE); Vincent Aubineau, Areches (FR); Ioseph E. Martinez-Pelayo, Austin, TX (US)

(73) Assignee: NXP USA, Inc., Austin, TX (US)

( * ) Notice: Subject to any disclaimer, the term of this patent is extended or adjusted under 35 U.S.C. 154(b) by 12 days.

(21) Appl. No.: 14/708,947

(22) Filed: May 11, 2015

(65) Prior Publication Data
US 2016/0173847 A1 Jun. 16, 2016

(30) Foreign Application Priority Data

Dec. 10, 2014 (WO) .................. PCT/IB2014/003046

(51) Int. Cl.
*G11B 31/00* (2006.01)
*H04N 5/77* (2006.01)
*G11B 27/32* (2006.01)

(52) U.S. Cl.
CPC .......... *G11B 31/006* (2013.01); *G11B 27/326* (2013.01); *H04N 5/77* (2013.01)

(58) Field of Classification Search
CPC ....... G11B 31/006; G11B 27/326; H04N 5/77
See application file for complete search history.

(56) References Cited

U.S. PATENT DOCUMENTS

| 5,299,007 A | 3/1994 | Saeger et al. |
| 5,754,234 A | 5/1998 | Kitsuki |
| 6,522,363 B1 | 2/2003 | Deiss et al. |
| 8,797,457 B2 | 8/2014 | Stevens |

(Continued)

FOREIGN PATENT DOCUMENTS

| CN | 100361502 C | 1/2008 |
| EP | 0805430 A1 | 11/1997 |

(Continued)

OTHER PUBLICATIONS

Geforce, Adaptive Vsync, downloaded from «http://www.geforce.com/hardware/technology/adaptive-vsync/technology» on Jan. 10, 2014, 2 pages.

(Continued)

*Primary Examiner* — Samantha (Yuehan) Wang

(57) ABSTRACT

In a video system, a video source, e.g., a camera, provides a source video stream. The source video stream comprises a stream of image data units. A buffer control unit writes the image data units consecutively to a circular buffer. A display control unit reads the image data units consecutively from the circular buffer to generate a target video stream in accordance with a read delay. The display control unit comprises a feedback loop which controls timing of the operation of reading the image data units from the circular buffer so as to reduce a difference between the read delay and a reference delay. The video system may, for example, be installed in a vehicle, e.g., for providing a driver with a live view from a camera.

11 Claims, 8 Drawing Sheets

(56) References Cited

U.S. PATENT DOCUMENTS

| | | | |
|---|---|---|---|
| 8,830,403 B1* | 9/2014 | Kametani | H04N 7/013 348/441 |
| 2003/0079106 A1* | 4/2003 | Yasuda | G11B 20/10527 711/220 |
| 2005/0231637 A1 | 10/2005 | Jeffrey et al. | |
| 2012/0307049 A1 | 12/2012 | Mimar | |
| 2013/0093583 A1* | 4/2013 | Shapiro | G01S 15/931 340/436 |
| 2013/0215333 A1* | 8/2013 | Kurokawa | H04N 5/66 348/739 |
| 2013/0229497 A1 | 9/2013 | Delacoux | |
| 2014/0139740 A1 | 5/2014 | Ohba et al. | |
| 2015/0011776 A1 | 1/2015 | Souza et al. | |
| 2015/0312504 A1 | 10/2015 | Aldridge et al. | |
| 2016/0191795 A1 | 6/2016 | Han et al. | |

FOREIGN PATENT DOCUMENTS

| | | | |
|---|---|---|---|
| EP | 1073269 A3 | 12/2003 | |
| EP | 1051191 B1 | 9/2006 | |
| EP | 2202715 A2 | 6/2010 | |

OTHER PUBLICATIONS

Bourke, Paul, "Report on low latency video capture and display," Sep. 2, 2012, downloaded from «http://paulbourke.net/papers/latencyreport.pdf», 4 pages.

Non-Final Office Action dated Sep. 23, 2016 for U.S. Appl. No. 14/953,724 18 pages.

U.S. Appl. No. 14/953,724, filed Nov. 30, 2015, entitled "Video Buffering and Frame Rate Doubling Device and Method".

Vatolin, Dmitriy S., "Video Frame Rate Double Up-Conversion," MSU Graphics and Media Lab (Video Group), downloaded from http://graphcis.cs.msu.ru/en/node/947; on Jun. 5, 2015; 3 pages.

Final Office Action dated May 5, 2017 for U.S. Appl. No. 14/953,734 23 pages.

Non-Final Office Action dated Oct. 11, 2017 for U.S. Appl. No. 14/953,724 15 pages.

Non-Final Office Action dated Jun. 14, 2018 for U.S. Appl. No. 14/953,724 21 pages.

* cited by examiner

VIDEO PROCESSING UNIT AND METHOD OF BUFFERING A SOURCE VIDEO STREAM

CROSS REFERENCE TO RELATED APPLICATION(S)

The present application claims priority to International Patent Application No. PCT/IB2014/003046, entitled "VIDEO PROCESSING UNIT AND METHOD OF BUFFERING A SOURCE VIDEO STREAM," filed on Dec. 10, 2014, the entirety of which is herein incorporated by reference.

FIELD OF THE INVENTION

This invention relates to a video processing unit and to a method of buffering a source video stream.

BACKGROUND OF THE INVENTION

A video stream is a stream of image data units that form a stream of video frames. A video frame, also called a frame, is a still image that can be displayed on a video display, e.g., on a liquid crystal display (LCD). Feeding a video stream to a display may cause the display to display the frames of the video stream to give a viewer the impression of a moving image. The number of frames per second provided by the video stream and the number of frames per second displayed by the display are each known as a frame rate.

In a real-time viewing system, a video camera may be operated to generate a source video stream. A video display may be arranged to be driven by the source video stream so as to provide a live view of the scene captured by the video camera. A buffer may be connected between the video source and the video display so as to buffer the source video stream in order to ensure smooth operation of the video display.

An example of a video system 10 comprising a video source 12, e.g., a camera, and a display 14 is schematically represented in FIG. 1. A video processing unit 16 may have an input connected to the video source 12 and an output connected to the display 14 for driving the display in real-time response to the video source 12. The video processing unit 16 may, for instance, comprise a memory unit 18, a buffer control unit 20, and a display control unit 22. The video processing unit 16 may operate as follows. The buffer control unit 20 receives the source video stream from the video source 12 and writes consecutive frames of the source video stream to the memory unit 18 in accordance with a circular buffering scheme. More specifically, the buffer control unit 20 may maintain three frame buffers 19a, 19b, and 19c in the memory unit 18. The buffer control unit 20 may write a first frame to the frame buffer 19a, the next frame (second frame) to the frame buffer 19b, and the following frame (third frame) to the frame buffer 19c. The following frame (fourth frame) may be written to the frame buffer 19a, overwriting the first frame. These operations may be repeated in a cyclic manner. Whenever a frame has been written to one of the frame buffers 19a, 19b, and 19c, it will be remain in the respective frame buffer for a duration of approximately two frames before it is overwritten by a later frame by the buffer control unit 20. The display control unit 22 thus has sufficient time for retrieving a buffered frame from the memory unit 18 before the frame is overwritten by the buffer control unit 20. For example, the buffer control unit 20, upon storing a complete frame in one of the frame buffers 19a to 19c, may provide the display control unit 22 with a control signal informing the display control unit 22 that the respective frame buffer is ready to be read out by the display control unit 22. The display control unit 22 may further feed the frames retrieved from the memory unit 18 consecutively to the display 14 in accordance with a target frame rate, e.g., 60 Hertz. The target frame rate may be substantially equal to the source frame rate, i.e., the frame rate of the source video stream, or it may differ. For example, the display control unit 22 may skip or repeat a frame provided by the frame buffers 19a to 19c.

SUMMARY OF THE INVENTION

The present invention provides a video processing unit and a method as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals identify identical, equivalent, or similar components.

DETAILED DESCRIPTION OF THE PREFERRED EMBODIMENTS

Figure 1:
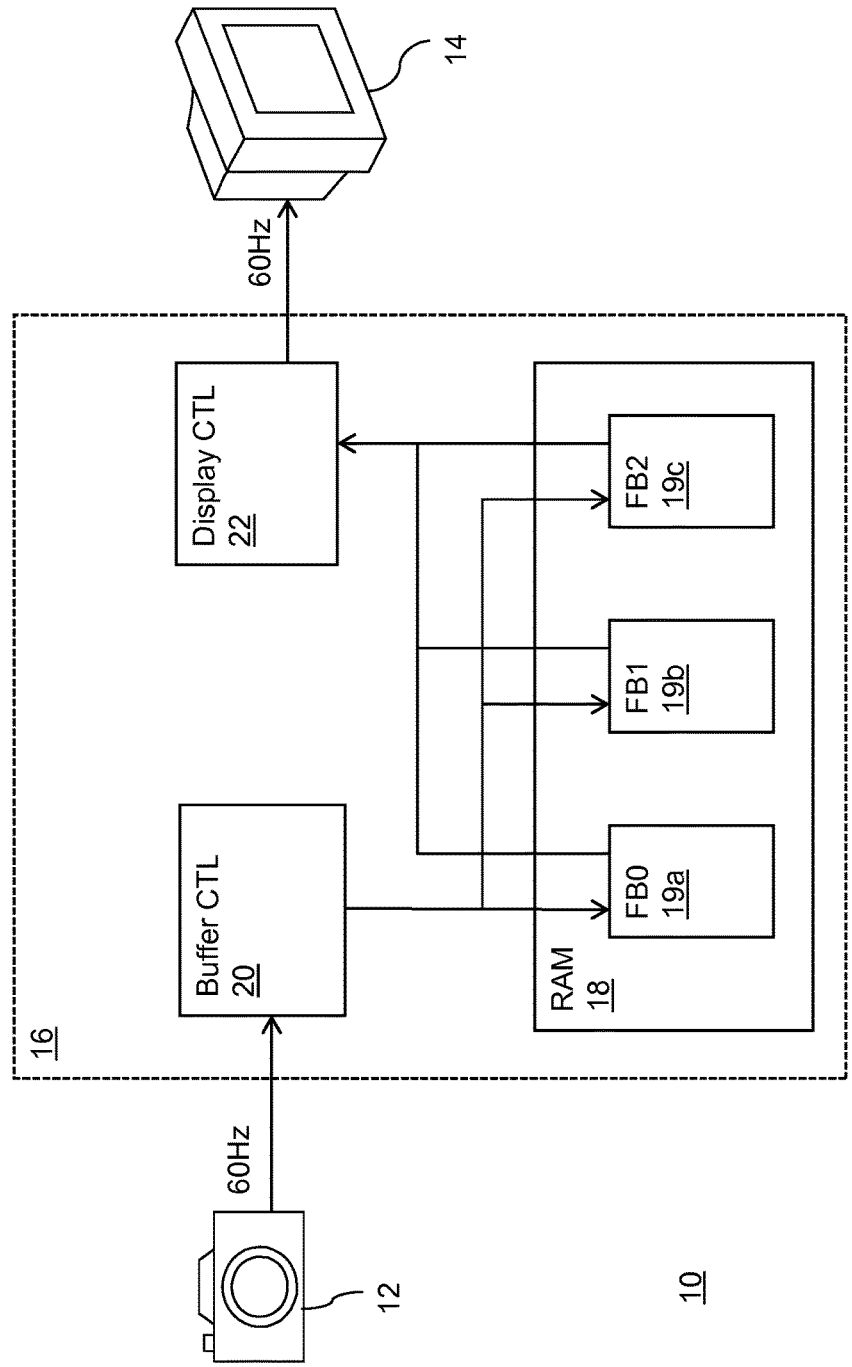
FIG. 1 schematically shows an example of an embodiment of a video system.

FIGS. 2 to 8 schematically illustrate examples of another embodiment of a video system 10 and a method of buffering a source video stream. The video system 10 may comprise a video source 12 (e.g., a video camera), a video processing unit 16, and a video display 14 (e.g., an LCD screen). The video processing unit 16 may comprise a buffer control unit 20 and a display control unit 22. The video source 12 may be arranged to provide a source video stream. The source video stream may comprise a stream of image data units forming a stream of video frames. The buffer control unit 20 may be arranged to write the image data units consecutively to a circular buffer 19. The display control unit 22 may be arranged to read the image data units consecutively from the circular buffer 19 to generate a target video stream.

The display control unit 22 may be operated with a read delay associated with it. The read delay may be a delay of said operation of reading the image data units from the circular buffer 19 relative to said operation of writing the image data units to the circular buffer 19. The display control unit 22 may comprises a feedback loop 24, 26, 28 arranged to control timing of said operation of reading the image data units from the circular buffer 19 so as to reduce a difference between the read delay and a reference delay. The frame rate of the target video stream can thus be adapted to the frame rate of the source video stream in a simple and robust manner so that the frame rate of the target video stream becomes substantially identical to the frame rate of the source video stream. Compared to an embodiment as described above with reference to FIG. 1, the circular buffer 19 can be smaller. The circular buffer 19 may, for example, be smaller than one frame of the source video stream. Furthermore, latency of the source video stream, i.e., a delay between the video source 12 and the video display 14, can be reduced. The video source 12 may, for example, be connected or connectable to a first clock so as to be clocked by the first clock. The display control unit 22 may be connected or connectable to a second clock so as to be clocked by the second clock. The first clock and the second clock may be operated independently, e.g., without synchronizing them.

The reference delay may, for example, be a time between 20% and 80% of the duration of a fill cycle of the circular buffer 19. The operation of controlling timing of said operation of reading the image data units from the circular buffer 19 may, for example, comprise adjusting one or both of a vertical synchronization gap and a horizontal synchronization gap of the target video stream. Alternatively or in addition, the read delay may be adjusted, for instance, by adjusting a clock rate of the display control unit 22. The read delay may, e.g., be the time between a vertical synchronization symbol in the source video stream and the next vertical synchronization symbol in the target video stream. The feedback loop may, for example, comprise a delay detector 26 arranged to measure the read delay on the basis of the source video stream and the target video stream. The delay detector 26 may comprise a first input connected to the video source 12 or the buffer control unit 20 for receiving the source video stream and a second input connected to the display control unit 12 for receiving the target video stream. In one example, the video source is arranged to provide the video frames and the vsync signals of the source video stream on separate channels, e.g., via separate output ports. In this case, the source video stream is provided on two or more separate channels. In another example, the frames and the vsync signals are provided on a common channel. For example, a vsync signal may be implemented as a symbol, e.g., as a certain combination of bits, that is included in the source video stream at the end of each frame. For instance, the delay detector 26 may comprise a counter 27 synchronized with the display control unit 22 and arranged to measure the read delay. The counter 27 may, for example, be arranged to start counting in response to a vertical synchronization symbol in the source video stream and to stop counting in response to a vertical synchronization symbol in the target video stream.

The method of buffering a source video stream may comprise: writing the image data units consecutively to a circular buffer 19; reading the image data units consecutively from the circular buffer 19, thus generating a target video stream with a read delay; and controlling timing of said operation of reading the image data units from the circular buffer 19 by negative feedback control so as to reduce a difference between the read delay and a reference delay.

Figure 2:
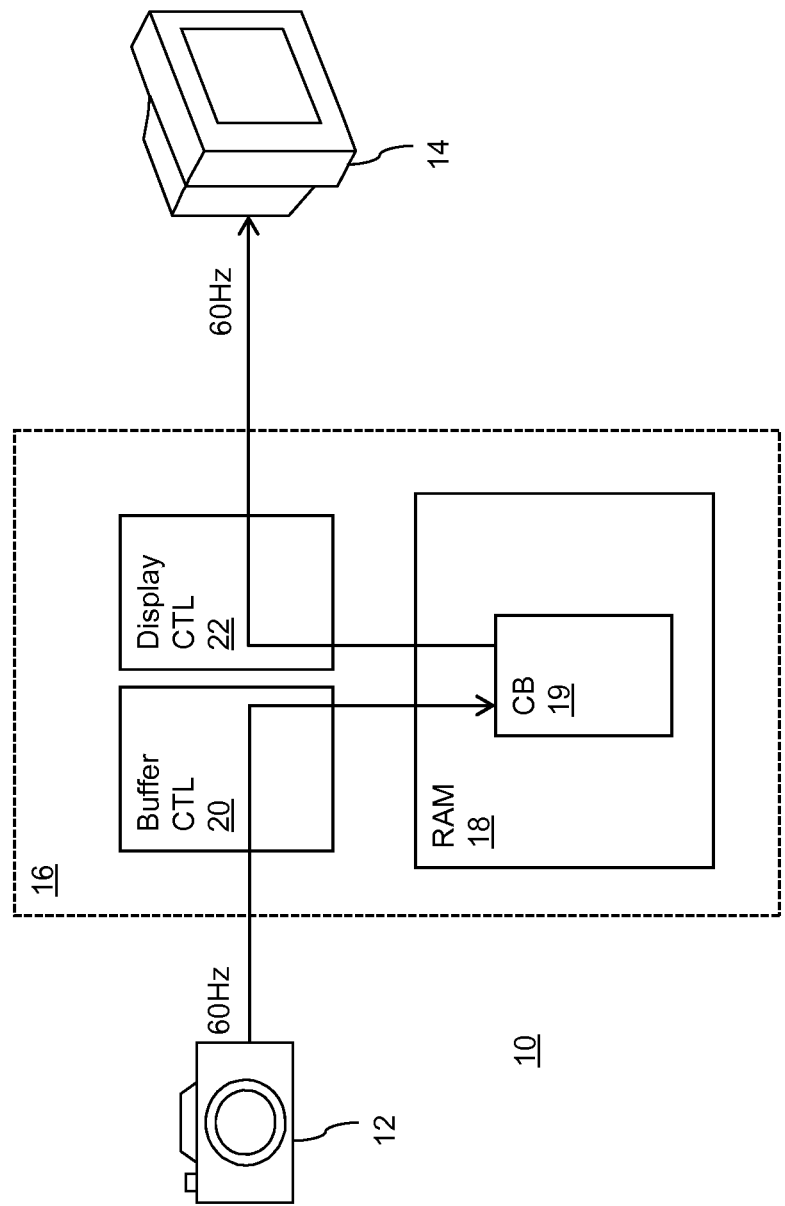
FIG. 2 schematically shows an example of an embodiment of a video system.

For example, as shown schematically in FIG. 2, the video system 10 may comprise a video source 12, a memory unit 18, a buffer control unit 20, and a display control unit 22. The memory unit 18, the buffer control unit 20, and the display control unit 22 may be located in a video processing unit 16 connected or connectable between a video source 12 and a video display 14. In a variant of the example, the memory unit 18 is an external memory unit connected or connectable to the video processing unit 16. The video source 12 may be arranged to provide a source video stream. The source video stream may comprise a stream of image data units forming a stream of video frames. The source frame rate, i.e., the frame rate of the source video stream, may, for instance, be in the range of 5 to 120 Hertz, e.g., 60 Hertz. Each image data unit may, for example, be one of the following: a pixel, a set of consecutive pixels, a horizontal synchronization (hsync) symbol, and a vertical synchronization (vsync) symbol-. The set of consecutive pixels may, for example, represent one horizontal line of a frame. The buffer control unit 20 may be arranged to write the image data units consecutively to a circular buffer 19. The circular buffer 19 may be located in the memory unit 18. A circular buffer or ring buffer is a set of memory elements that has a circular buffering scheme associated with it. A circular buffering scheme is a memory access scheme in which the memory elements of the circular buffer are accessed in a circular, i.e. cyclic, manner. Accordingly, in a circular buffer comprising memory elements numbered 1 to n, access to memory element n may be followed by access to memory element 1.

The display control unit 22 may be arranged to read the image data units consecutively from the circular buffer 19, i.e. from the memory unit 18 in accordance with the circular buffering scheme, i.e., in a circular or cyclic manner. The display control unit 22 may thus generate a target video stream. The target video stream may be fed to the display 14. The display control unit 22 may have a read delay associated with it. The read delay may be a delay between said operation of reading the image data units from the circular buffer 19 relative to said operation of writing the image data units to the circular buffer 19. The read delay may be time-dependent. Notably, the read delay may be different for subsequent fill cycles of the circular buffer 19. The granularity in time in which the read delay is defined may vary from one implementation to another. For instance, in one implementation, each read access to a memory element of the circular buffer 19 by the display control unit 22 may have its own read delay associated with it. The read delay associated with the respective read access may be measured, for example, relative to a preceding write access to the respective memory element.

In another implementation, each read-out cycle of the circular buffer may have its own read delay associated with it, i.e., the read delay may be defined with a relatively coarse granularity in time. In other words, the read delay may be defined as a time shift between a fill cycle and an associated read-out cycle. A fill cycle is the sequence of n write operations in which the n memory elements 1 to n of the circular buffer 19 are filled with video data. The associated read-out cycle is the sequence of n read operations in which the video data is read from the n memory elements 1 to n of the circular buffer 19 before this video data is overwritten by the next fill cycle. The fill cycle and the associated read-out cycle may partly overlap in time. For example, when the circular buffer is implemented in a single-port memory unit, the sequence of write operations of the fill cycle may be interleaved with the sequence of read operations of the associated read-out cycle.

The display control unit 22 may comprise a feedback loop arranged to control timing of said operation of reading the image data units from the circular buffer 19 so as to reduce a difference between the read delay and a reference delay. In other words, the read delay may be controlled by negative feedback. Read access of the display control unit 22 to the circular buffer 19 may thus be timed appropriately with respect to write access of the buffer control unit 20 even in an embodiment in which the buffer control unit 20 and the display control unit 22 are clocked independently. For example, the buffer control unit 20 may be clocked by the video source 12 while the display control unit 22 may be clocked by a display clock which may operate independently from the video source 12.

The size of the circular buffer 19, i.e., its capacity, may be less than the source frame size, which is the frame size of the source video stream. The circular buffer 19 may in this case absorb only part of a frame of the source video stream. The required memory of the video system 10 may thus be reduced compared to an implementation in which an entire frame or more is buffered. For example, the size of the circular buffer 19 may be between 10% and 40%, or between 30% and 60%, or between 50% and 90% of the source frame size.

The reference delay may, for example, be between 20% and 80% of the fill time of the circular buffer 19. The fill time is the duration of one fill cycle of the circular buffering scheme, i.e., the time it takes the buffer control unit 20 to fill the n memory elements of the circular buffer 19. The risk of the display control unit 22 reading invalid data from the circular buffer 19 can thus be minimized. Note that operation of the buffer control unit 20 and the display control unit 22 may be represented by a rotating write pointer and a rotating read pointer, respectively. The write pointer and the read pointer indicate the next memory element of the circular buffer at which a write access and a read access will take place, respectively. An appropriate setting of the reference delay, e.g., between 20% and 80% of the fill time, may ensure that the risk of the write pointer overtaking the read pointer or vice versa remains below a critical level. An average phase shift of approximately 180° between the write pointer and the read pointer may be achieved by setting the reference delay to approximately 50% of the fill time.

The read delay may be adjusted, for example, by adjusting a vertical synchronization gap (vsync gap) of the target video stream. The vsync gap is a pause included in the target video stream after a vsync symbol. Its effect may be that of freezing the image on the display 14 for the duration of the vsync gap in response to a vsync symbol in the target video stream. The vsync gap may be implemented, for example, by means of a certain number of "invisible" additional lines at the end of a frame, e.g., between ten and twenty additional lines. Alternatively or in addition, the read delay may be adjusted, for example, by adjusting a horizontal synchronization gap (hsync gap) of the target video stream. The hsync gap is a pause which may be included in the target video stream after an hsync symbol.

Figure 3:
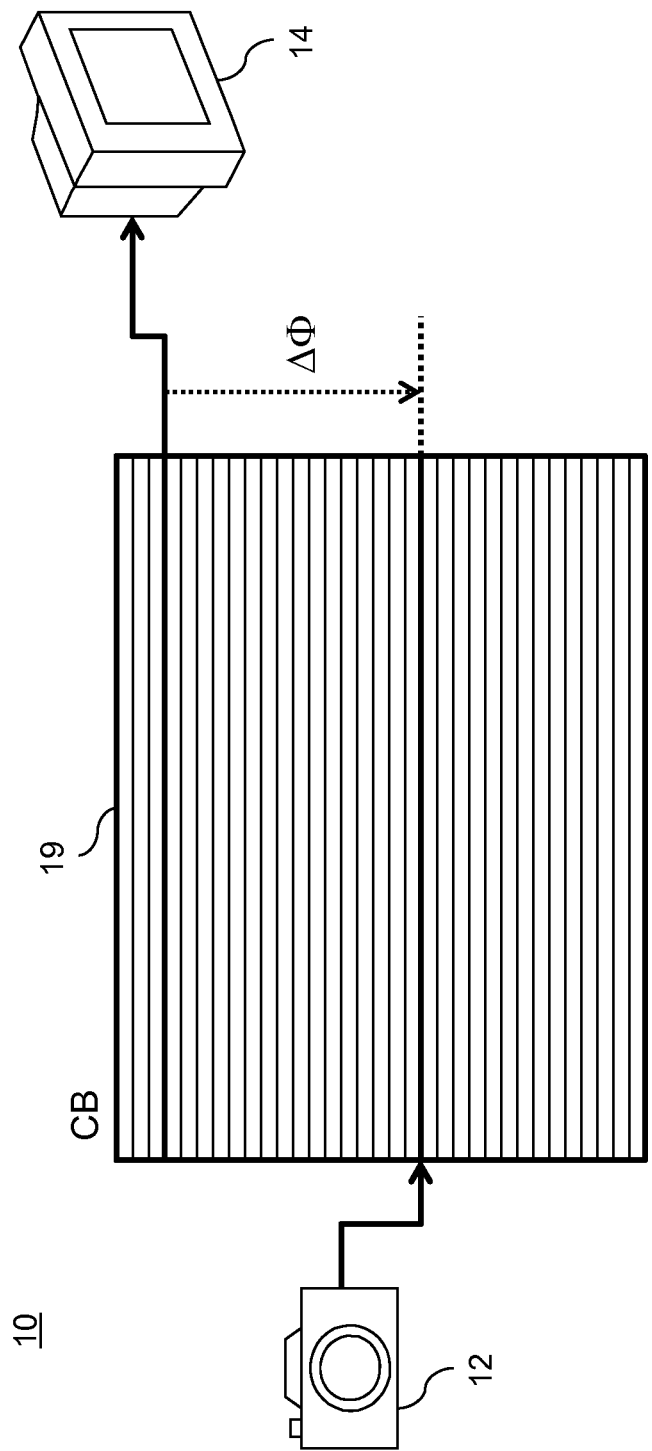
FIG. 3 schematically shows an example of an embodiment of a circular buffer.

In the example of FIG. 3, the circular buffer 19 comprises a total of, e.g., 32 memory elements (represented as horizontal stripes) which may be numbered 1 to 32. The figure represents a state in which the write pointer of the buffer control unit 20 (symbolized by the arrow from the video source 12) is at the end of memory element number 19 or, equivalently, at the beginning of memory element number 20 and in which the read pointer of the display control unit 22 (symbolized by the arrow to the display 14 is at the end of memory element number 3 or, equivalently, at the beginning of memory element number 4. Accordingly, the read pointer in this example exhibits a read delay of approximately 50% of the fill time of the circular buffer 19, or equivalently, a phase shift of approximately 180° with respect to the write pointer. The read delay may represent a safety margin for avoiding an incident in which one of the two pointers (e.g., the read pointer) overtakes the other pointer, (e.g., the write pointer).

The safety margin may be useful when the two pointers advance at different speeds. This may occur, for instance, in an implementation in which the video source 12 and the display control unit 22 operate at slightly different clock rates, e.g., due to being clocked independently from each other. The safety margin, i.e., the read delay, may be sufficiently wide for preventing the read pointer from overtaking the write pointer in the circular buffer 19 and vice versa. One of the two pointers overtaking the other one could result in the display control unit 22 reading wrong content from the circular buffer 19. Furthermore, the safety margin may be useful in an unexpected incident in which the video source 12 stalls for a brief moment, e.g., for a period shorter than, e.g., 20% of the fill time of the circular buffer 19.

Figure 4:
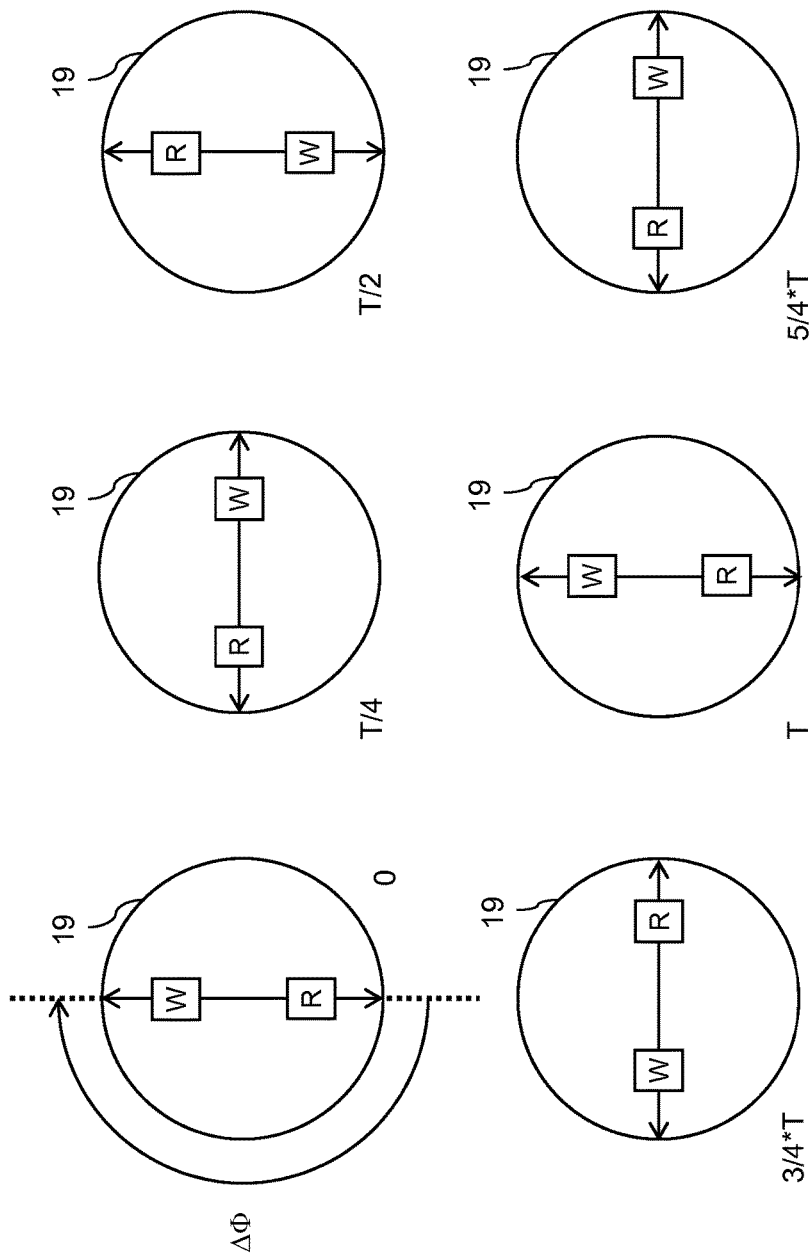
FIG. 4 schematically shows an example of an embodiment of a circular buffer.

In the example of FIG. 4, the circular buffer 19 is schematically illustrated as a circle along with the write pointer W of the buffer control unit 20 and the read pointer R of the display control unit 22. In operation, the write pointer W may advance in steps in accordance with the source video stream from the video source 12. The step size may be different for different implementations. For instance, in one implementation, each step may correspond to one pixel. In another implementation, each step may correspond to a group of several pixels, e.g., one horizontal line of pixel. The read pointer R may advance similarly, albeit independently, from the write pointer W. Feedback control of the read pointer may ensure that under normal operating circumstances, the read pointer will exhibit a phase shift $\Delta\Phi$ relative to the write pointer W which does not differ substantially from a reference phase shift. In the example, the reference phase shift is 180°. The figure illustrates the positions of the read and write pointers R and W at the following times: 0, T/4, T/2, ¾*T, T, and 5/4*T. T is the fill time.

Each of the source video stream and the target video stream may include a pause after each line and a pause after each frame. These pauses are known as the hsync gap and the vsync gap, respectively. When a complete line has been written to the circular buffer 19, the write pointer W may stop for the duration of the hsync gap of the source video stream. Similarly, when a complete line has been read from the circular buffer 19, the read pointer R may stop for the duration of the hsync gap of the target video stream. When a complete frame has been written to the circular buffer 19, the write pointer W may stop for the duration of the vsync gap of the source video stream. Similarly, when a complete frame has been read from the circular buffer 19, the read pointer R may stop for the duration of the vsync gap of the target video stream. The durations of the hsync gap and the vsync gap of the target video stream may be different from the durations of the hsync gap and the vsync gap of the source video stream, respectively.

Figure 5:
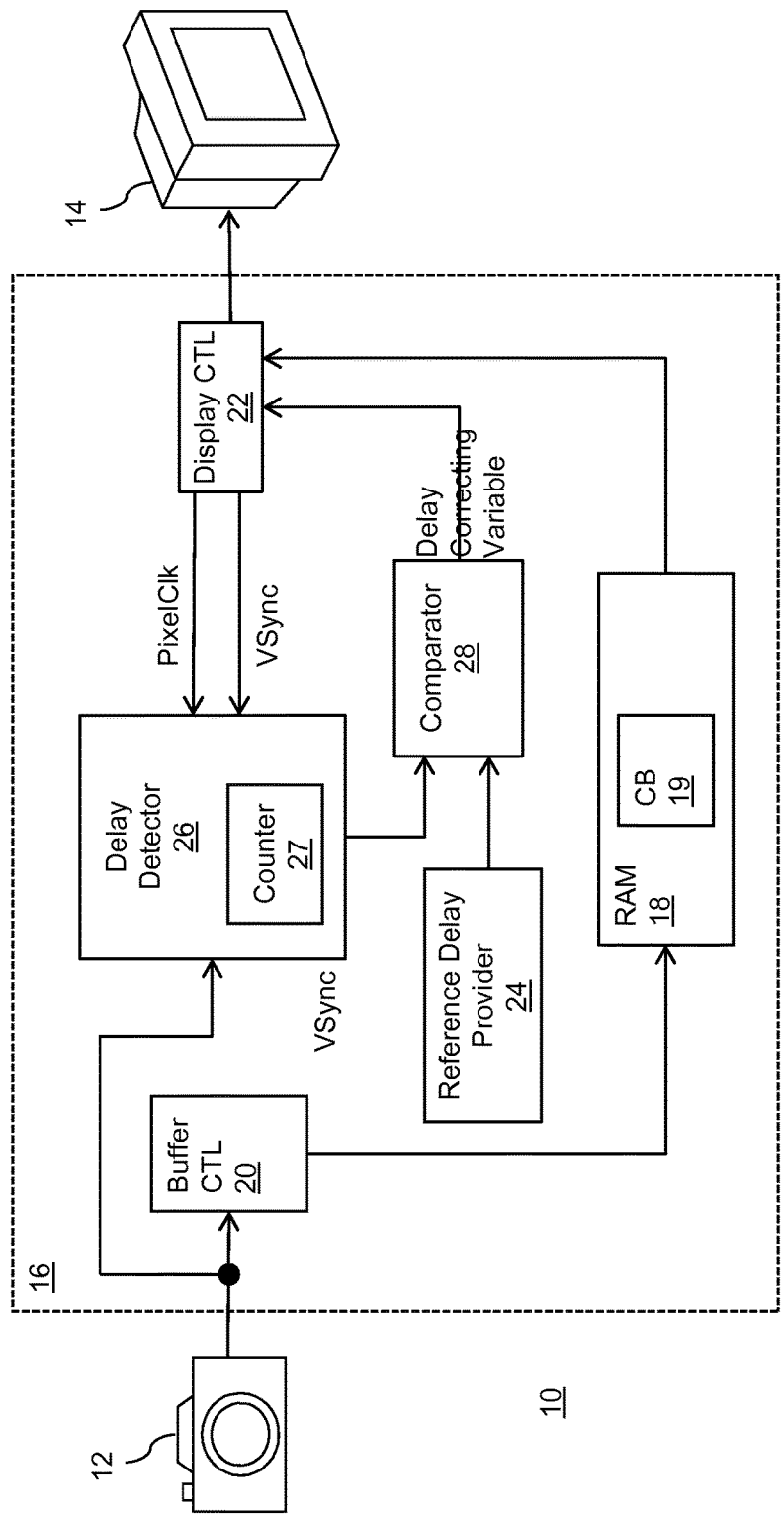
FIG. 5 schematically shows an example of an embodiment of a video system.

In the example of FIG. 5, the display control unit 22 forms part of a feedback loop. The feedback loop may comprise the display control unit 22 and, e.g., a reference delay provider 24, a delay detector 26, and a comparator 28. In operation, the delay detector 26 may determine a read delay. The reference delay provider, e.g., a programmable or nonprogrammable memory element, may indicate a reference delay. The comparator 28 may compare the read delay and the reference delay to determine a delay correcting variable. For example, the comparator 28 may determine a difference between the read delay and the reference delay as the delay correcting variable. The display control unit 22 may effectively adjust the read delay as a function of the delay correcting variable. For instance, the display control unit 22 may adjust the vsync gap, e.g., with each new frame of the target video stream. The vsync gap may, for instance, be adjusted in accordance with the following equation: vsyncgap_new=vsyncgap−K*(read_delay−reference_delay), wherein K is a positive number, e.g., a programmable or nonprogrammable constant. Conveniently, K may be less than 1, as this may lead to fast convergence of the read delay.

The delay detector 26 may, for example, determine the read delay in response to a vsync symbol in the source video stream by measuring the time from the vsync symbol in the source video stream to the next vsync symbol in the target video stream from the display control unit 22. This time may be measured, for example, by means of a counter 27 which is reset to, e.g., 0, and which starts counting in response to the vsync symbol in the source video stream and which stops counting in response to, e.g., a vsync symbol in the target video stream. Instead of being arranged to stop counting, the counter 27 may be arranged to be read out, e.g., in response to a vsync symbol in the target video stream. The counter 27 may be clocked by the display control unit 22, or both may be clocked by the same clock signal, thus facilitating the feedback control.

Figure 6:
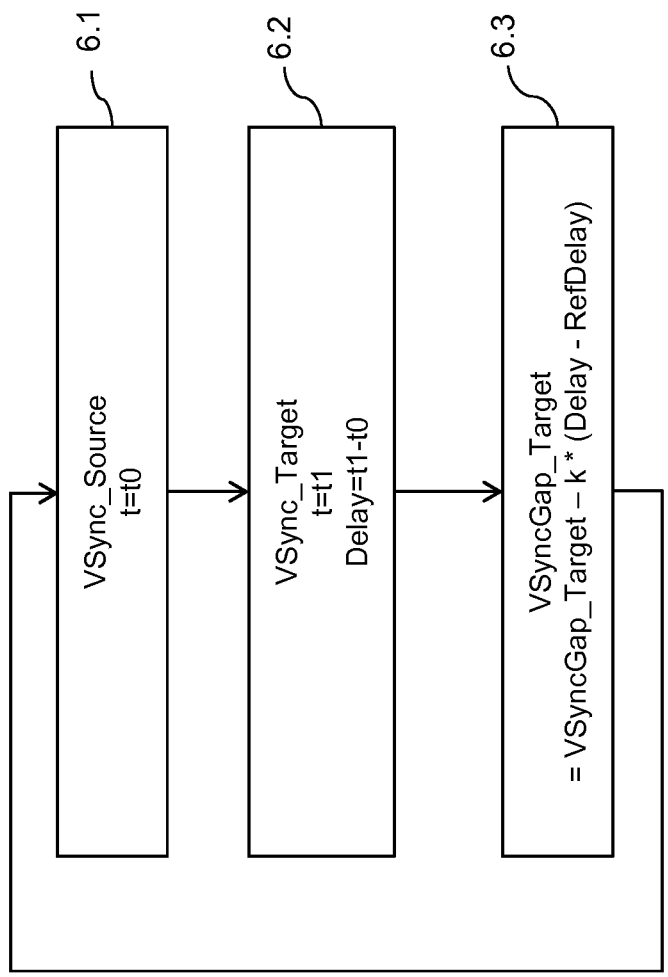
FIG. 6 shows a flow chart of an example of a method of buffering a video stream.

The flow chart in FIG. 6 schematically illustrates an example of feedback control of a display control unit in a video system of the kind described above in reference to FIGS. 2 to 5. At an instance T=T0, the delay detector 26 may detect a vsync symbol in the source video stream (6.1). The delay detector 26, in response to detection of the vsync symbol in the source video stream, may start counting. At a subsequent instance T=T1, the delay detector 26 may detect a vsync symbol in the target video stream (6.2) and, in response thereto, may stop counting. The delay detector 26 may thus determine a read delay as the time difference T1−T0. The display control unit 22 may then adjust its vsync gap as a function of its current vsync gap and the difference between the read delay (determined in 6.2) and the reference delay (6.3). These operations may be repeated in a cyclic manner, e.g., with each new frame of the source video stream with new times T0 and T1.

Figure 7:
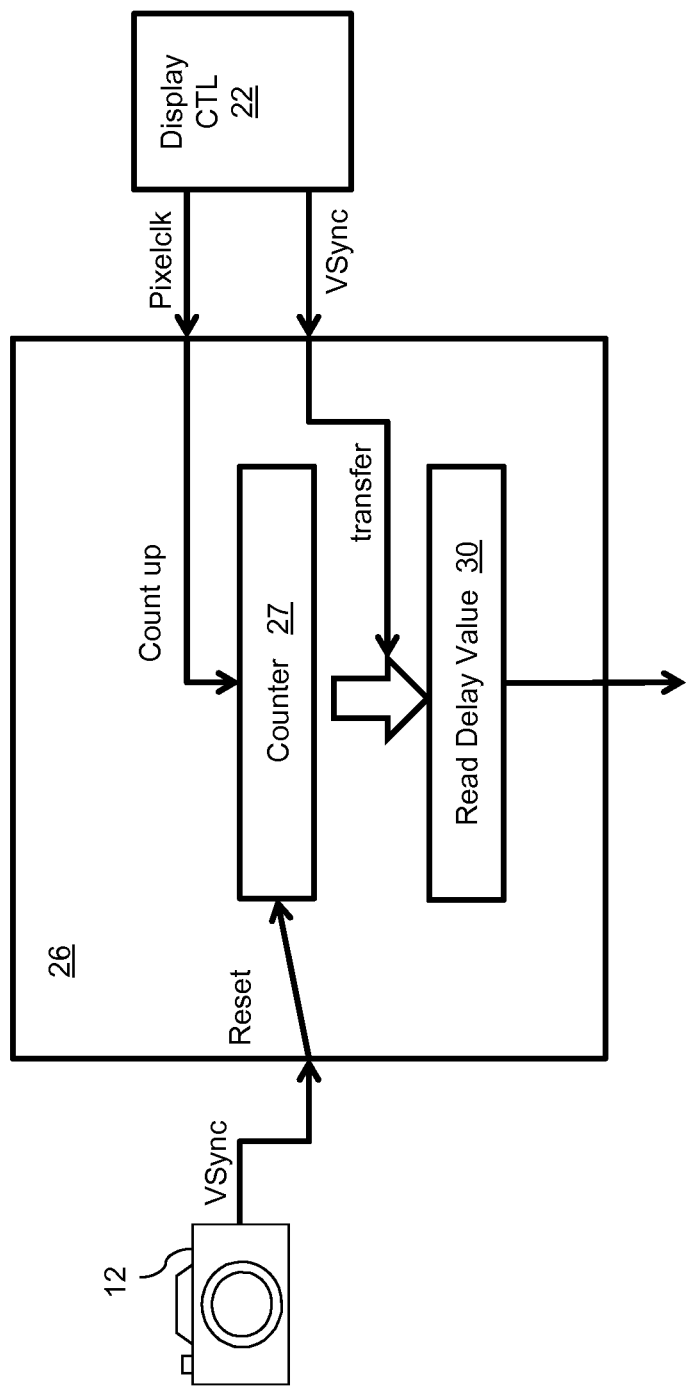
FIG. 7 schematically shows an example of an embodiment of a delay detector.

FIG. 7 schematically illustrates another example of an embodiment of the delay detector 26. In the example, the counter 27 is arranged to be reset in response to a reset event, e.g., in response to a vsync symbol in the source video stream. Furthermore, the delay detector 26 may comprise a memory element 30, e.g., a register, arranged to capture the current value of the counter 27 in response to a capture event, e.g., in response to a vsync symbol in the target video stream. The captured value, reflective of the time from the reset event to the capture event, may be considered a measure of the read delay and be compared against a defined reference delay.

Figure 8:
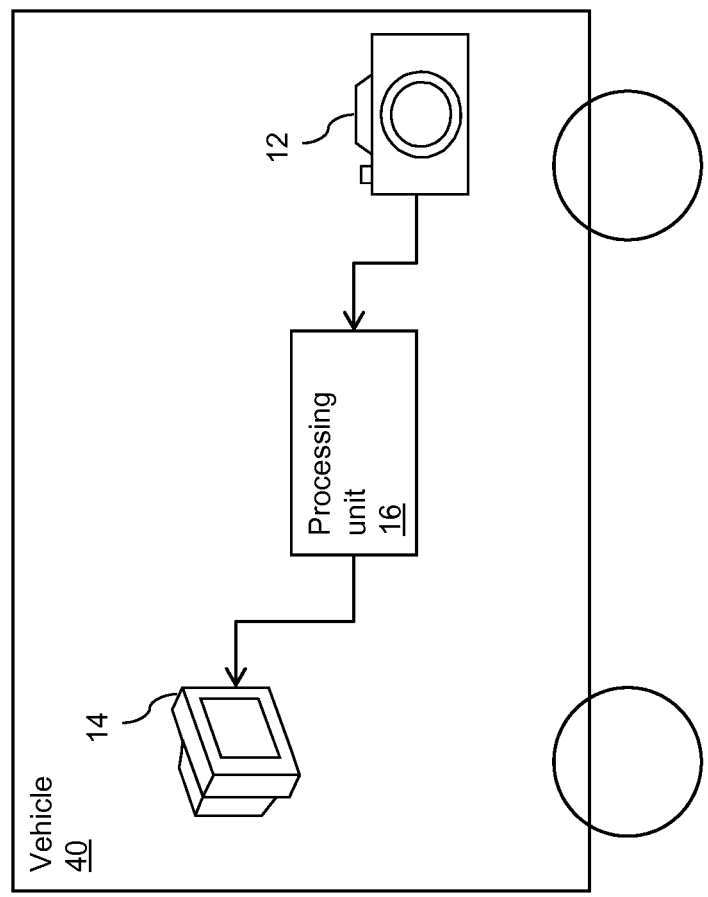
FIG. 8 schematically shows an example of an embodiment of a vehicle.

FIG. 8 schematically shows an example of a video system in which the video source 12 is a video camera 12. The video system may be mounted in or on a vehicle 40, e.g., a motor car. The video camera 12 may, for instance, be mounted near a rear section of the vehicle and it may be oriented so as to provide a backward view. The display 40 may be mounted so as to be visible for a driver (not shown) of the vehicle. The driver may thus be provided with a live view of a backward scene of the vehicle 40, e.g., for facilitating maneuvering the vehicle in a constrained environment, e.g., when parking the vehicle.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the buffer control unit 20 and the display control unit 22 may be integrated in a memory control unit (MCU).

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. For example, a sequence of read operations may be combined in a single read operation, and a sequence of write operations may be combined in a single write operation.

Also for example, in one embodiment, the illustrated examples may be implemented as circuitry located on a single integrated circuit or within a same device. For example, the video processing unit 16 may be implemented in a single integrated circuit. Alternatively, the examples may be implemented as any number of separate integrated circuits or separate devices interconnected with each other in a suitable manner. For example, the memory unit 18, the buffer control unit 20, and the display control unit 22 may be located on interconnected separate devices.

Also for example, the examples, or portions thereof, may be implemented as soft or code representations of physical circuitry or of logical representations convertible into physical circuitry, such as in a hardware description language of any appropriate type.

Also, the invention is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A video processing unit, connected or connectable to a video source so as to receive a source video stream from the video source, the source video stream comprising a stream of image data units forming a stream of video frames; wherein the video processing unit comprises:
   a buffer controller to write the image data units consecutively to a circular buffer, wherein the size of the circular buffer is less than a frame size of the source video stream; and
   a display controller arranged to read the image data units consecutively from the circular buffer to generate a target video stream with a vertical synchronization, the display controller having a read delay associated with it, said read delay being a delay of said operation of reading the image data units from the circular buffer relative to said operation of writing the image data units to the circular buffer;

wherein the display controller forms part of a feedback loop arranged to control timing of said operation of reading the image data units from the circular buffer so as to reduce a difference between the read delay and a reference delay, wherein the feedback loop includes a delay detector and a comparator, the comparator configured to compare said read delay received from the delay detector with the reference delay and provide a delay correcting variable to the display controller to prevent the display controller from reading invalid image data units from the circular buffer, the delay detector configured to measure the read delay on the basis of the source video stream and the target video stream, the delay detector having a first input coupled to the video source for receiving the source video stream, and the delay detector coupled to receive a pixel clock signal and a vertical synchronization signal from the display controller, wherein the vertical synchronization signal indicates the vertical synchronization of the target video stream, wherein the delay detector includes a counter arranged to start counting in response to a vertical synchronization symbol in the source video stream and to stop counting in response to a vertical synchronization symbol in the target video stream.

2. The video processing unit of claim 1, wherein the reference delay is between 20% and 80% of the duration of a fill cycle of the circular buffer.

3. The video processing unit of claim 1, wherein said operation of controlling timing of said operation of reading the image data units from the circular buffer comprises adjusting one or both of a vertical synchronization gap and a horizontal synchronization gap of the target video stream.

4. The video processing unit of claim 1, wherein the read delay is the time between a vertical synchronization symbol in the source video stream and the next vertical synchronization symbol in the target video stream.

5. The video processing unit of claim 1, wherein the counter is synchronized with the display controller and arranged to measure the read delay.

6. The video processing unit of claim 1, wherein the delay detector comprises a second input connected to the display controller for receiving the target video stream.

7. The video processing unit of claim 1, wherein the video source is connected or connectable to a first clock so as to be clocked by the first clock and wherein the display controller is connected or connectable to a second clock so as to be clocked by the second clock, wherein the first clock and the second clock are operable independently.

8. The video processing unit of claim 1, connected or connectable to a video display which is arranged to be driven by the target video stream.

9. The video processing unit of claim 1, wherein the video source is a camera.

10. A vehicle comprising the video processing unit of claim 9, wherein the camera is mounted in or on the vehicle.

11. The vehicle of claim 10, wherein the camera is mounted near a rear section of the vehicle and oriented to provide a backward view.

* * * * *